Aug. 12, 1941.  P. F. EVERITT  2,252,341
SEXTANT AND SIMILAR INSTRUMENTS FOR ANGULAR MEASUREMENT
Filed March 8, 1938  3 Sheets-Sheet 1
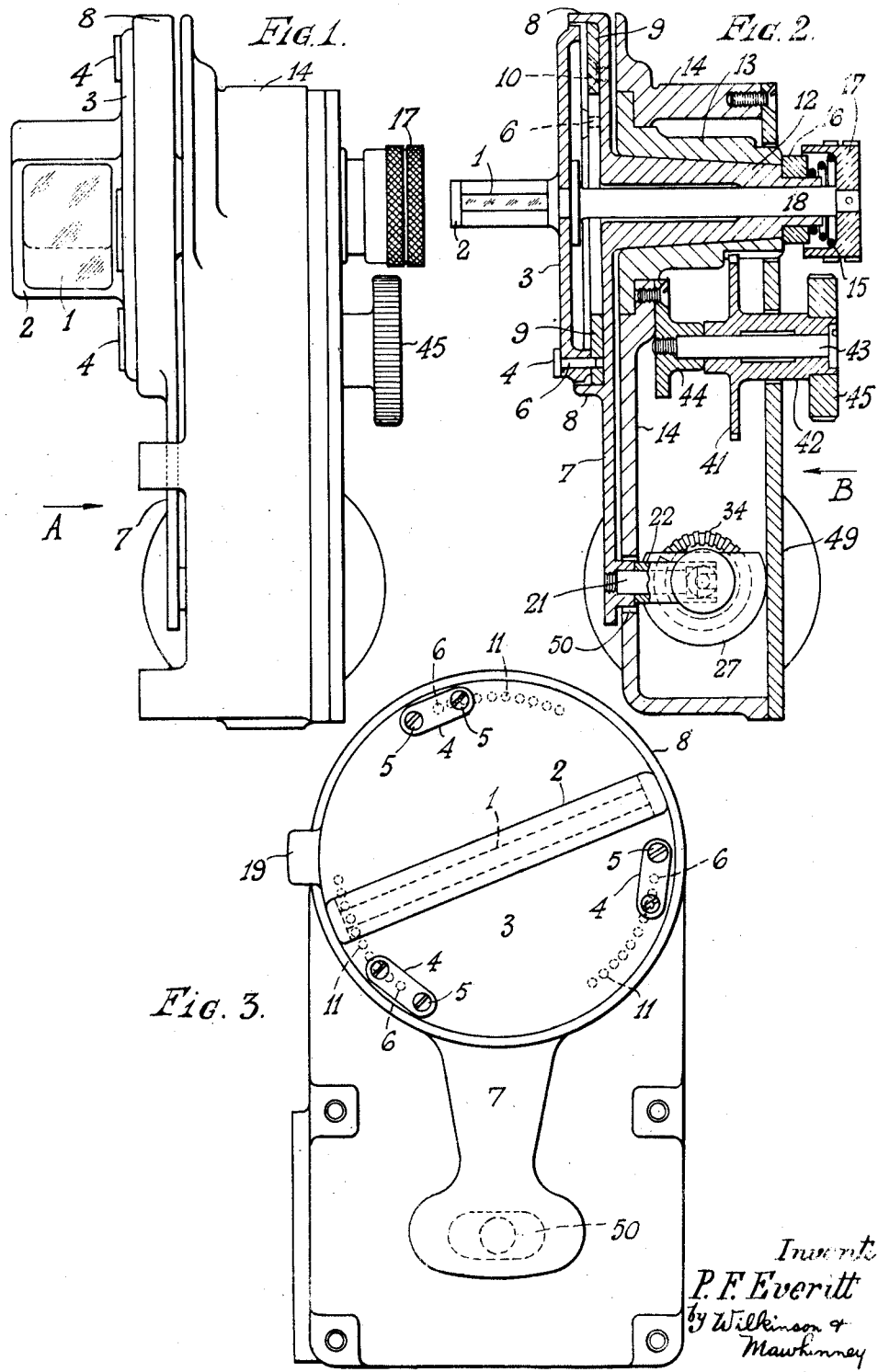

Inventor
P. F. Everitt
by Wilkinson & Mawhinney
Attorneys.

Aug. 12, 1941.   P. F. EVERITT   2,252,341
SEXTANT AND SIMILAR INSTRUMENTS FOR ANGULAR MEASUREMENT
Filed March 8, 1938   3 Sheets-Sheet 3

Inventor
P. F. Everitt
by Wilkinson & Mawhinney
Attorneys.

Patented Aug. 12, 1941

2,252,341

UNITED STATES PATENT OFFICE 2,252,341

SEXTANT AND SIMILAR INSTRUMENTS FOR ANGULAR MEASUREMENT

Philip Francis Everitt, Ilford, England, assignor of two-thirds to Arthur Joseph Hughes, Chigwell Row, Essex, England, and Henry Hughes & Son, Limited, London, England, a corporation of Great Britain Application March 8, 1938, Serial No. 194,664
In Great Britain June 7, 1937

13 Claims. (Cl. 33—70)

This invention relates to sextants and similar instruments for the measurement of angles in which a member—a mirror in the case of a sextant—is mounted for rotation and the angular movement of which is measured to give the angle required. In such instruments provision is generally made for coarse and fine adjustment of the rotatable member and in sextants the mirror is generally mounted rigidly on an arm or carrier which can be given a fast or slow swinging movement so that the same member is used for both coarse and fine adjustments.

The object of the present invention is to provide an improved construction of sextant or similar instrument in which the adjustments are more easily carried out than in existing instruments and a further object is to simplify the construction of the instrument while retaining a high order of accuracy.

A still further object of the invention is to provide an improved fine adjustment or slow motion mechanism and to provide an improved coarse adjustment or fast motion whereby the rotatable member (i. e. the mirror in a sextant), can be released from the fine adjustment mechanism and turned freely and then reconnected to the fine adjustment mechanism after being turned through a predetermined definite angle or multiples thereof.

Other objects of the invention are to provide means whereby the average value of a predetermined number of readings of the measuring instrument can be read off immediately the number of readings has been completed, and also to provide means for preventing an operator from taking more than the predetermined number of readings in the series to be averaged.

In one suitable form of fast motion or coarse adjustment mechanism two plates are provided, one having equally spaced holes disposed in a circle and the other having corresponding pins or projections; one of the plates is secured to the axis of the slow motion mechanism while the other plate carries the mirror of the sextant or other instrument and is normally coupled to the first plate through the pins and holes. The two plates can, however, be disengaged from each other and the plate carrying the mirror can be rotated relatively to the other to readjust the position of the pins with respect to the holes, and the plates re-engaged so that the mirror has been turned through an angle corresponding to one or more of the spaces between the holes.

This arrangement may be regarded as the introduction of a second phantom axis of rotation for the mirror which does not introduce errors of eccentricity usually associated with two concentric rotational axes.

Other important features of the invention will be apparent from the accompanying detailed description and the claims appended at the end of the description.

Furthermore, the arrangement above described can be modified in various ways as will be apparent from the following description, which refers to one preferred constructional form of a sextant as an example of an instrument to which the invention is applicable.

The accompanying drawings show only those parts of a sextant which are relevant to the present invention and in the drawings—

Fig. 1 is an elevation of the parts as viewed when using the sextant.

Fig. 2 is a corresponding sectional view, but with the sextant mirror shown horizontal and with certain parts of the internal gearing omitted for the sake of clearness.

Fig. 3 is a view looking in the direction of arrow A in Fig. 1,

Fig. 6 being an elevation, Fig. 7 a section on line VII—VII of Fig. 6, and Fig. 8 is a section on line VIII—VIII of Fig. 6.

Figure 4:
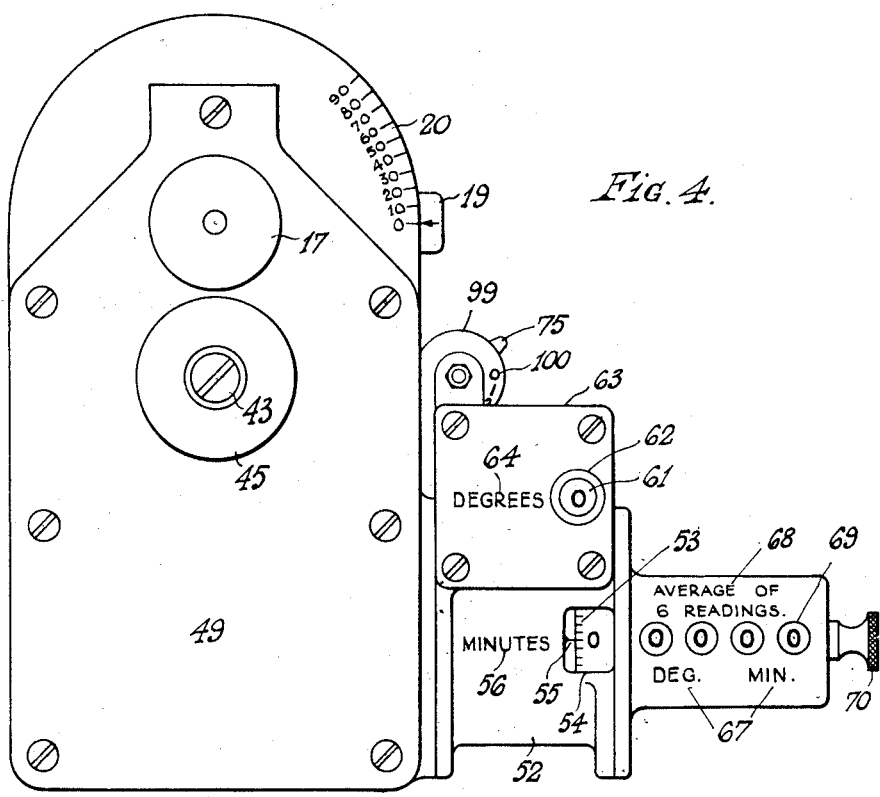
Fig. 4 is a side elevation looking in the direction of arrow B in Fig. 2.

The sextant mirror is indicated at 1 and is held in a frame 2 which is secured diametrically across the face of a circular plate or disc 3 preferably made of stainless steel. This disc 3 has secured to it, by plates 4 and screws 5, three pins 6 which are also preferably made of stainless steel and extend through the plate 3 and project from the face of the disc opposite to that on which the mirror 1 is secured. The three pins 6 are spaced 120° apart.

A lever 7 has an enlarged circular head 8 which is slightly greater in diameter than the disc 3 and is recessed to receive a circular plate 9 (Fig. 2) which is secured to the lever head 8 by screws, such as indicated at 10. The plate 9 has three groups of holes 11 (Fig. 3) drilled on a circle of the same diameter as the circle defined by the three pins 6 and the holes 11 are spaced 5° apart from each other and the groups are spaced 120° apart. The holes 11 and the pins 6 are made and positioned as accurately as possible so that the pins and holes engage for all positions. The lever 7 fulcrums on an integral conical ground centre 12 which fits into a corresponding tapering bearing 13 secured to the frame 14 of the sextant.

The pins 6 are held in the holes 11 by the action of a helical coil spring 15 which bears, through a collar 16, on the end of the conical centre 12 and on the inside of a knob 17 which is secured to the end of a spindle 18 projecting from the centre of the disc 3. By pushing the knob 17 inwards, the disc 3 is moved away from the holed plate 9 and the pins 6 disengaged from the holes 11 and by rotating the knob 17 while it is still pushed in the disc 3 and mirror 1 can be rotated through 5° or multiples thereof until the pins 6 come opposite the next or succeeding holes of each group and the knob then released to allow the pins to re-enter the holes. Each rotation through 5° of the disc 3 relative to the lever 7 of course involves a rotation through 10° of the light rays reflected from the mirror 1 and the above described movements constitute the coarse adjustment of the sextant. The free ends of the pins may be rounded, or other means may be provided, to ensure that the pins 6 always enter the holes 11 on the release of the knob 17 even if the adjustment has not been exactly 5° or multiples thereof. By providing ten holes in each group as shown the sextant can have a coarse adjustment through a total range of 90° and the extent of the adjustment is indicated by an index mark on a projection 19 (Figs. 3 and 4) from the disc 3 which moves against a scale 20 (Fig. 4) marked on the casting of the instrument.

The fine adjustment of the sextant mirror is effected by swinging the lever 7 on its conical centre 12 through a total range of movement of about 7½° by means of the micrometer screw mechanism described below, and it should be noted here that the axial centre line of the conical centre 12 is the true axis of rotation of the mirror and the arrangement of pins and holes for coarse adjustment as described above may be regarded as the introduction of a second phantom axis of rotation for the mirror which does not introduce errors of eccentricity usually associated with two concentric rotational axes. Thus the spindle 18 merely acts as a guide member and not as an axis of rotation and there is therefore no necessity to ensure extreme accuracy in fitting this spindle into the centre of the conical fulcrum 12.

Figure 5:
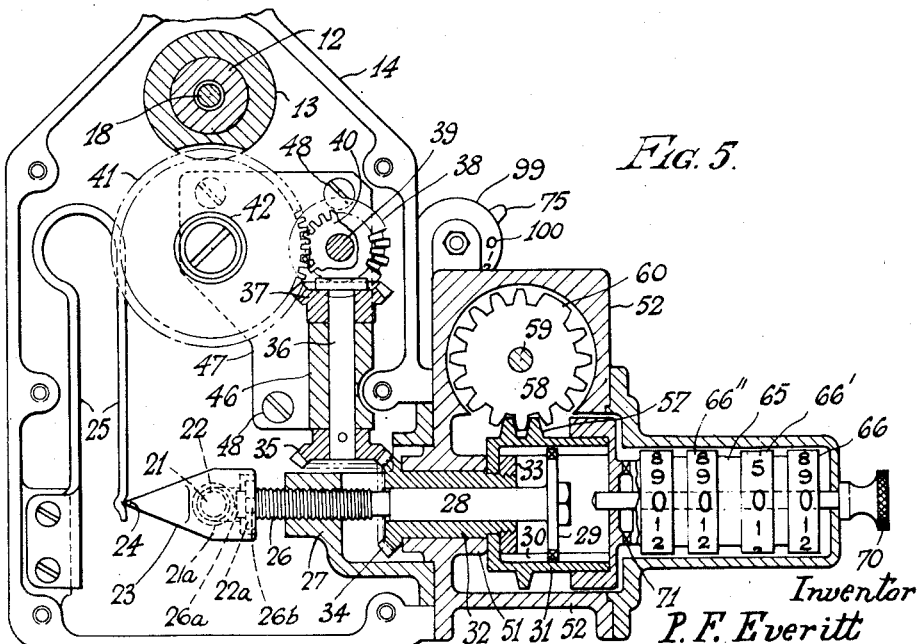
Fig. 5 is a sectional view corresponding to Fig. 4.

The free end of the lever 7 has secured to it a stud 21 surrounded by a sleeve 22 which fits transversely into a pointed head 23 (Fig. 5) whose pointed end 24 bears against a spring 25 carried by the casing 14. The head 23 is carried on the end of a micrometer screw 26 which is free to rotate relative to the member 23 but carries this member 23 with it in its longitudinal movements.

The micrometer screw 26 engages in an internally screwed hole in a bracket 27 and has a plain cylindrical extension 28 having on its free end an externally splined disc 29 which engages with internal splines 30 on the inside of a drum 31. The cylindrical extension 28 is supported in a sleeve 32 which at one end is secured to the drum 31 by a nut 33 screwed internally to screw on the end of the sleeve 32. The other end of the sleeve 32 is formed as a bevel gear 34 which meshes with a bevel gear 35 fixed on the lower end of a vertical spindle 36 which has secured on its upper end another bevel gear 37. The bevel gear 37 meshes with a bevel gear 38 rotating on a pin 39 and formed integrally with a spur gear 40 meshing with a larger spur gear 41 integral with a sleeve 42 (Fig. 2) rotating on a pin 43 carried by a bracket 44 screwed to the casing 14. The sleeve 42 projects outside the casing and has secured on its projecting end a knurled knob 45.

The spindle 36 is supported by a boss 46 on a plate 47 secured by screws 48 to the inside of the casing. This plate also carries the pin 39, and as the mechanism indicated by the reference numerals 35 to 40 merely forms a motion transmission gearing which does not affect the accuracy of the instrument it is possible to construct and insert this gearing as a separate unit mounted on the plate 47. This unit can thus be removed and replaced at any time, without affecting the accuracy or setting of the instrument, by removing the knob 45 and the cover plate 49 (Fig. 2) and removing the screws 48 and lifting out the plate 47 and the mechanism it carries.

The fine adjustment of the sextant mirror is carried out by turning the knob 45, the motion of which is transmitted, through the transmission unit just described, to the sleeve 32 which in turn rotates the drum 31 and, through the splines 31 and the splined disc 29, the micrometer screw 26 which by its longitudinal motion causes a swinging movement of the lower end of the lever 7 and hence, through the holed plate 9 and the pins 6, a movement of the mirror 1. The longitudinal movement of the screw 26 is, of course, transmitted to the lever by the pointed head 23 and the sleeve 22 and stud 21 which projects through a slot 50 in the casing. The spring 25 keeps the head 23 always pressed against the end of the micrometer screw and ensures that there is no slackness in the movements transmitted to the lever.

The sleeve 32 rotates in a bearing 51 formed by an extension 52 of the casing which also encloses the drum 31. This drum is provided on its periphery with scale divisions 53 (Fig. 4) indicating minutes of arc and the scale 52 is visible through a window 54 in the casing 52 against a fixed index mark 55. A description of the meaning of the reading is marked on the outside of the casing as indicated at 56. The curved surface of the drum 31 is also provided with a worm thread 57 which meshes with and drives a worm wheel 58 rotating on a spindle 59 supported by the casing 52. The worm wheel has a blank portion 60 which, when it is engaged by flat ends on the worm 57, acts as a positive stop to limit the movement of the lever 7 in both directions of its swing. The worm wheel 58 also carries an indicator 61 (Fig. 4) marked with numerals to show the number of degrees of arc through which the light ray reflected from the mirror has been swung and the numerals on the indicator 61 are visible in turn through a small circular window 62 in a cover plate 63 which is marked as at 64 to show that the numeral seen through the window 62 indicates degrees.

The drum 31 also drives a totalising counter 65 which is constructed and operates in the usual manner; that is to say, a complete rotation of the figured disc 66 at one end of the totaliser causes the next following disc 66' to be stepped forward to show the next following numeral marked on it, and a complete rotation of this second disc 66' causes the next disc 66'' to be stepped forward from one numeral to the next and so on. In this case the drums are marked to show degrees and minutes as indicated by markings 67 (Fig. 4) on the exterior casing of the totalising counter. The extreme right hand disc 66 (which indicates the units figure of minutes of arc) is marked with the numerals 0 to 9 and rotates at the same speed as the drum 31. The drum 31 and the micrometer screw 26 make one revolution for each degree change in the altitude measurement and the discs 66 and 66' will indicate this as 10 minutes which is one-sixth of the actual measurement. Therefore if six readings are totalised by the counter 65 it will indicate, at the end of the sixth reading, the average value of these six readings. This indicated by the marking 68 on the outside of the totaliser. The totaliser reading is seen through windows 69. The totaliser can be reset at zero by the resetting knob 70.

Figures 6, 7:
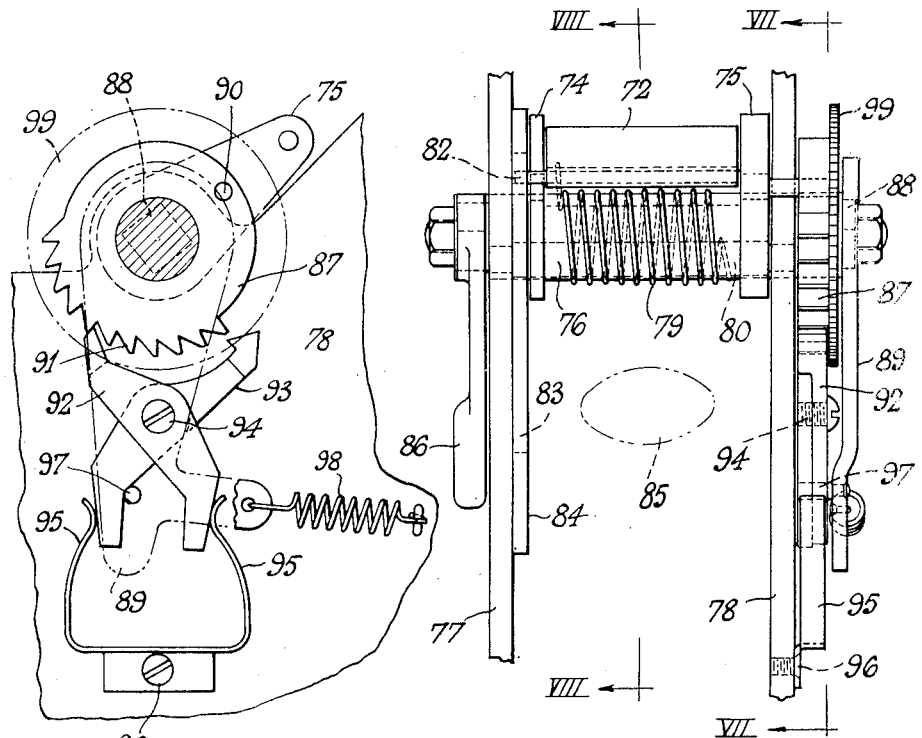
Figs. 6, 7 and 8 are enlarged detail views of the cut-off mechanism.
Figure 8:
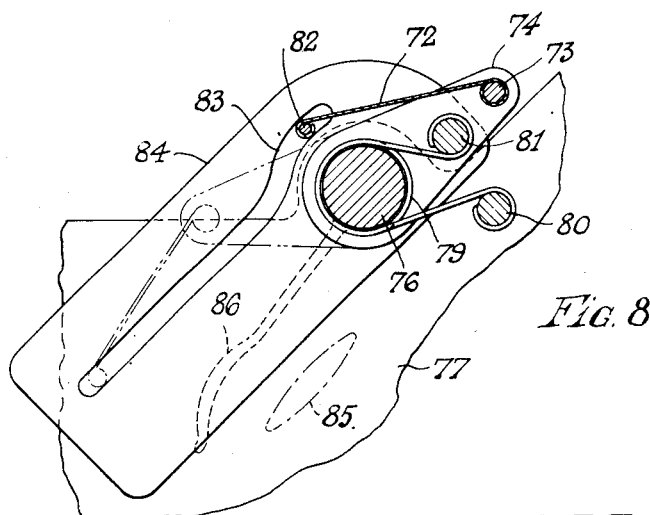

To indicate to the observer when the six readings have been completed, the cut-off mechanism now to be described is provided, and to enable the sextant to be readjusted to the second and subsequent readings without cancelling the indication already shown on the totaliser the latter is coupled to the drum 31 through a clutch indicated at 71 so that the totaliser can be declutched from the drum 31 while the latter is being turned back before taking the next reading. The clutch 71 is disengaged by movement of a clutch lever forming part of the cut-off mechanism shown in detail in Figs. 6 to 8.

This cut-off mechanism preferably consists of a shutter which is stepped forward at each observation so that an indicator associated with it shows the number of the observations, and after the sixth observation the shutter is released to cover a part of the instrument which must normally be visible, for example the bubble collimating lens in the case of a bubble sextant, and remind the observer that he has completed six observations.

The shutter 72 (Figs. 6 and 8) is pivoted on a rod 73 extending between a pair of arms 74, 75 which are freely rotatable on a spindle 76 carried by two frame plates 77, 78. Surrounding the spindle 76 is a coil spring 79 which is attached at one end to a bar 80 spacing the two frame plates and at the other end to a bar 81 secured between the arms 74, 75. The spring 79 urges the arms 74, 75, to swing about the spindle 76 in a counterclockwise direction as viewed in Figs. 7 and 8 and when the arms are finally released they swing into the position shown dotted in Fig. 8, the free end of the shutter 72 being provided with a projecting pin 82 which moves in a guide slot 83 in a plate 84 secured on the frame plate 77, so that the shutter 72 likewise occupies the dotted position shown in Fig. 8. When the shutter is in its lower (dotted) position, the observer is prevented from observing, for instance, the bubble collimating lens, the position of which is indicated in chain dotted outline (Figs. 6 and 8) at 85. The spindle 76 projects beyond the outer faces of the frame plates 77, 78 in which it is journaled and on one projecting end of the spindle is secured the clutch operating lever 86 while the other projecting end of the spindle carries a ratchet wheel 87, freely rotatable thereon, and has a squared portion 88 on which fits one end of a lever 89 which is connected by a link (not shown) to the clutch 71 (Fig. 5) associated with the totaliser. The ratchet wheel 87 is connected with the arm 75 by a pin 90 projecting from the arm 75, over the edge of the frame plate 78 and into a socket or hole in the ratchet wheel 87. The ratchet wheel does not have teeth all round its circumference but has only eleven teeth 91, the rest of the wheel 87 being plain. The ratchet is released in steps to turn under the action of spring 79 by an escapement consisting of two separate pawls 92, 93, both pivoted on a pin 94 and pressed into engagement with the teeth 91 by two spring arms 95 secured by a screw 96 to the frame plate 78, but rocked alternately clear of the teeth 91 by a projecting pin 97 on the lever 89 as this lever is swung (by pressing on the clutch lever 86) into the position indicated in Fig. 7 and returned by the action of a return spring 98. Therefore, as the clutch lever 86 is pressed after each sextant reading to disconnect the totaliser as above described, the ratchet wheel is allowed to move round through two half steps until, at the sixth operation of the clutch lever, the teeth 91 move clear of both pawls and the arms 74, 75 are released to drop the shutter into its lowest position in which it obscures the bubble collimating lens. The shutter can be reset by hand to its original raised position by rotation of a disc 99 integral with the ratchet wheel 87 and having a knurled edge to enable it to be turned by one finger. This disc 99 is also marked with numerals 100 (Figs. 3 and 4) and acts as an observation counter to show the operator how many of the sequence of readings have been taken.

In making altitude observations with the sextant, the instrument is adjusted as follows. The knob 17 is pushed in until the pins 6 are freed from the holes in plate 9 and the knob 17 is then rotated, whilst still pushed in, until approximate apparent coincidence of bubble and object is obtained and the knob is then rotated slightly further in a clockwise direction as viewed in Fig. 4 until the pins 6 can be engaged with the appropriate holes in plate 9 and the knob 17 is then released. The knob 45 is now rotated to bring the bubble and object into exact apparent coincidence. If only a single observation is made the altitude can then be determined by reading the figure for tens of degrees on scale 20 opposite the index on 19 (using the lower figure when the index lies between two divisions) and reading the figure visible at 62 for units of degrees and the scale 53 for minutes. If an average of six readings is required, the bubble and object are brought into exact apparent coincidence as above described and the clutch lever 86 is pressed and the knob 45 is turned as far as it will go in a clockwise direction (as viewed in Fig. 4) while the lever 86 is held pressed and this lever is then released. This action returns the micrometer screw to zero while leaving one sixth of the first measurement on the totaliser. The knob 45 is now turned counter-clockwise and adjusted to bring the bubble and object into coincidence again and the lever 86 is again pressed while the knob 45 is returned as before and lever 86 is then released. This allows one sixth of the second measurement to remain on the totaliser. The operations are repeated until one sixth of each of six separate measurements has been transferred to the totaliser which will then indicate at the windows 69 the average of the six micrometer measurements. This only requires to be added to the reading of the tens of degrees as obtained from the scale 20 to give the average of the six altitudes.

It is not possible to take seven readings by mistake if the observation counter 99 has been set to zero before commencing the series of readings; on attempting to make a seventh measurement, the observer finds that the bubble is obscured by the shutter 72 and knows at once that the series is finished.

After the average altitude reading has been noted the clutch lever 86 is pressed and the totaliser reset to zero by means of the resetting knob 70, lever 86 is released and the shutter 72 reset by turning disc 99 ready for the next series of observations.

The mechanism above described can be fitted to any other suitable instrument besides a sextant and it will be obvious that modifications may be made to the mechanism without affecting its usefulness and accuracy. For example, by making the spindle 18 a good fit through the centre of the cone 12 so that it can be an axis of rotation, or by providing a separate axis pin for this purpose, only one pin in the disc 3 and one group of holes in plate 9 need be provided, or two pins and two groups of holes may be used. With three or more pins, of course, the phantom axis above mentioned can be retained. Obviously, also, the pin or pins and holes are mutually interchangeable i. e. the pin or pins 6 could project from the plate 9 and the group or groups of holes 11 be provided in the disc 3. The pins and holes which couple the member (in this case disc 3) carrying the element to be adjusted (i. e. the mirror in the case of a sextant) to the fine adjustment mechanism can be replaced by any other suitable form of coupling which permits of the same adjustment as that obtained by the use of pins and holes. Thus, a suitable ratchet connection might be used, or the member carrying the mirror or other movable element of the instrument could be a drum with radially movable pins or bolts which can project into or be withdrawn from holes or sockets in a second drum surrounding or inside the first and coupled to the fine adjustment mechanism. Furthermore it is possible to use other known forms of fine adjustment mechanism in place of the micrometer screw arrangement described in the detailed description.

What I claim as my invention and desire to secure by Letters Patent is:

1. A sextant comprising a rotatable disc, a mirror disposed diametrically across the surface of and projecting normal to the plane of said disc, a plurality of pins projecting normal to the plane of the disc and disposed on a circle centred on the rotational axis of the mirror and disc, a fine adjustment mechanism, a second disc substantially co-axial with the first disc and permanently coupled to said fine adjustment mechanism, holes in the second disc into which said pins fit, said holes being arranged in a plurality of groups on a circle corresponding in radius and axis with that on which the pins are disposed with the holes of each group spaced at predetermined angular distances from one another, and means for moving the first disc axially away from the second to disengage the pins from the holes and for rotating the first disc to bring the pins opposite other holes in the same group and then moving the disc axially towards the second disc to locate the sextant mirror in a new position at a predetermined angle to its original position by the pins entering the appropriate holes.

2. An angle measuring instrument comprising a movable element, a member carrying said element, pins projecting from said member, a second member substantially coaxial with the first mentioned member provided with a plurality of groups of holes receiving said pins, means for disengaging each pin from a hole of one of said groups and relatively rotating said members and re-engaging each pin in another hole of the same group, whereby said element is moved through a predetermined angle, fine adjustment mechanism for said element having an operative connection with said second member, and a totaliser driven from said mechanism and showing a reading which is fixed fractional part of the portion of the instrument reading derived from the fine adjustment, whereby the totaliser indicates the average of a predetermined number of instrument readings.

3. An angle measuring instrument comprising a movable element, a member carrying said element, pins projecting from said member, a second member substantially coaxial with the first mentioned member provided with a plurality of groups of holes for receiving said pins, means for disengaging each pin from a hole of one of said groups and relatively rotating said members and re-engaging the pins in other holes of the same groups whereby said element is moved through a predetermined angle, fine adjustment mechanism for said element, and having an operative connection with said second member, a totaliser driven from said mechanism, a clutch in the drive from the fine adjustment mechanism to the totaliser, a lever for disconnecting said clutch, an observation counter, and mechanism coupled to said lever for stepping forward said counter at each actuation of the lever.

4. In an angle-measuring instrument having a fine adjustment mechanism, a totaliser driven from said mechanism, a clutch coupling said totaliser to said mechanism, an observation counter, and means operated by the clutch-disengaging mechanism for stepping said counter forward at each disengagement of said clutch.

5. An angle measuring instrument comprising a movable element, a member carrying said element, pins projecting from said member, a second member provided with holes receiving said pins, means for disengaging each pin from a hole and relatively rotating said members and re-engaging each pin in another hole, whereby said element is moved through a predetermined angle, fine adjustment mechanism for said element, having an operative connection with said second member, a totaliser driven from said mechanism, a clutch in the drive from the fine adjustment mechanism to the totaliser, a lever for disconnecting said clutch, an observation counter, and mechanism coupled to said lever for stepping forward said counter at each actuation of the lever, a shutter coupled to said observation counter, and means controlled by said clutch lever for moving said shutter into a position to obscure part of the instrument to prevent further readings being taken after a predetermined number of actuations of the clutch lever.

6. In an angle-measuring instrument, an angularly movable element, and a swinging lever, means for detachably coupling the head of said lever to the movable element to permit mechanically predetermined angular movement of said element independently of said lever, a micrometer screw, means for coupling the free end of the lever to said screw, means for retaining said coupling in constant engagement with the end of the micrometer screw, a fixed threaded member receiving said screw, means for rotating said screw to produce fine angular adjustment of said movable element by swinging movement of said lever, an engraved drum rotatable with the micrometer screw, a worm thread on the exterior of said drum, a worm wheel engaging said worm thread, a blank portion on said worm wheel engageable by said worm thread at the limits of the travel of the micrometer screw, and an engraved dial rotated by said worm wheel.

7. In an instrument for making angular measurements, a micrometer screw, a lever operatively connected to said screw and having a head, a disc secured to the head of the lever, a second disc mounted substantially coaxially with said first disc, a rotatable member carried by said second disc, one of said discs being provided with smooth circumferentially spaced holes, smooth pins projecting from the other disc and fitting into said holes, means for effecting relative axial and rotational movements of said discs to permit the pins to be disengaged from the holes and fitted into different holes at predetermined angular distances from the holes originally occupied by the pins.

8. In an angle-measuring instrument, means establishing an angularly-movable line of sight, fine adjustment mechanism for so moving said sight line, a totalizer, clutch means having disengaging means interposed between said mechanism and said totalizer, vision obscuring means movable to cut off the line of sight, spring means for urging said vision obscuring means into obscuring position and means operated by said disengaging means and connected to said totalizer to release said spring means and move the vision obscuring means to obscuring position after a predetermined number of operations of said totalizer.

9. In an observation device the combination of a frame, means supported on said frame for making an observation measurement, a register supported on said frame controlled by said means for indicating the numerical average of a series of a predetermined number of said measurements, a member movably supported on said frame and controlled by said means for making observations to move automatically into a position to prevent further observation measurements from being made after said series of measurements has been made and means for resetting said member to another position to permit another series of measurements to be made.

10. In an observation device, the combination of a frame, means supported on said frame including a sighting device, for making an observation measurement, a register supported on said frame controlled by said means for indicating the numerical average of a series of a predetermined number of said measurements, a member supported on said frame and controlled by said means to move automatically into the field of vision through said sighting device after said series of measurements has been made, and means for moving said member out of said field of vision to permit another series of measurements to be made.

11. In an observation instrument, the combination of a frame, means supported on said frame for making an observation measurement, a register supported on said frame controlled by said means for indicating the numerical average of a series of a predetermined number of said measurements, a member supported on said frame and controlled by said means to move automatically into the field of vision of the operator while making an observation measurement after said series of measurements has been made, and means for moving said member out of said field of vision to permit another series of observation measurements to be made.

12. In an observation device the combination of a frame, means supported on said frame for making an observation measurement, a register supported on said frame controlled by said means for indicating the numerical average measurement of a series of a predetermined number of said measurements, signalling means supported on said frame operated by and in response to completion of said series of measurements to indicate that said series is completed, and means for rendering said signalling means inoperative to permit another series of measurements to be made.

13. A sextant comprising a first rotatable member, a mirror extending across the surface of and projecting normal to said member, a fine adjustment mechanism, a second member rotatable coaxially with said first member and coupled to said fine adjustment mechanism for rotation thereby, cooperating interengageable means on said first and second members spaced at predetermined angular distances for changing the angular relationship of said first and second members, and rendering them coaxial, and means supporting at least one of said first and second members for relative axial movement to engage and disengage said interengageable means, whereby said members may be separated to disengage said interengageable means, rotated relatively to change the angular relationship between said members and moved together to reengage said interengageable means to locate the members in the new angular and coaxial relationship.

PHILIP FRANCIS EVERITT.